(12) United States Patent
Davidson

(10) Patent No.: US 9,359,149 B2
(45) Date of Patent: Jun. 7, 2016

(54) CONVEYOR WORK STATION

(71) Applicant: Eton Innovation AB, Gånghester (SE)

(72) Inventor: Mikael Davidson, Gånghester (SE)

(73) Assignee: ETON INNOVATION AB, Gånghester (SE)

( * ) Notice: Subject to any disclaimer, the term of this patent is extended or adjusted under 35 U.S.C. 154(b) by 0 days.

(21) Appl. No.: 14/413,834

(22) PCT Filed: Jul. 12, 2013

(86) PCT No.: PCT/SE2013/050892
§ 371 (c)(1),
(2) Date: Jan. 9, 2015

(87) PCT Pub. No.: WO2014/011113
PCT Pub. Date: Jan. 16, 2014

(65) Prior Publication Data
US 2015/0203302 A1    Jul. 23, 2015

(30) Foreign Application Priority Data
Jul. 13, 2012 (SE) .................................. 1250834

(51) Int. Cl.
*B65G 17/20* (2006.01)
*B65G 47/61* (2006.01)
*B65G 37/00* (2006.01)

(52) U.S. Cl.
CPC ................ *B65G 47/61* (2013.01); *B65G 17/20* (2013.01); *B65G 37/00* (2013.01); *B65G 2201/0229* (2013.01)

(58) Field of Classification Search
CPC ........... B65G 47/61; B65G 2201/0229; B65G 2812/02019; B65G 2812/02069; B65G 47/56; B65G 47/57
USPC ..................................................... 198/465.4
See application file for complete search history.

(56) References Cited

U.S. PATENT DOCUMENTS

| | | | | |
|---|---|---|---|---|
| 1,597,929 A | * | 8/1926 | Sjolander | A22B 7/001 198/370.03 |
| 1,650,971 A | * | 11/1927 | Young | B65G 47/61 198/408 |
| 2,796,165 A | * | 6/1957 | Carr | B65G 47/00 198/465.4 |

(Continued)

FOREIGN PATENT DOCUMENTS

CN    86106210 A    4/1987
CN    2741929 Y    11/2005

(Continued)

OTHER PUBLICATIONS

Office Action issued Nov. 6, 2015 in CN Application No. 201380036810.6 (English translation only).

*Primary Examiner* — Mark A Deuble
(74) *Attorney, Agent, or Firm* — Knobbe Martens Olson & Bear LLP

(57) ABSTRACT

The invention relates to a conveyor work station comprising an endless conveyor chain adapted to carry product carriers in a hanging manner from a loading position to a release position, where the conveyor work station comprises an upper driven chain wheel positioned at the release position, and a loading arrangement at the loading position, wherein the conveyor work station further comprises a guide track arranged between the upper chain wheel and the loading arrangement, where the guide track is adapted to support the conveyor chain, thereby allowing the conveyor chain to be pushed from the upper chain wheel to the loading arrangement. The advantage of the invention is that a simple and reliable conveyor work station is provided, which only comprises one chain wheel.

10 Claims, 4 Drawing Sheets

(56) References Cited

U.S. PATENT DOCUMENTS

| | | | | | |
|---|---|---|---|---|---|
| 3,338,179 | A | * | 8/1967 | Klemm | B61B 10/025 101/112 |
| 4,817,778 | A | * | 4/1989 | Davidson | B65G 17/20 198/346.1 |
| 6,206,178 | B1 | * | 3/2001 | Jacobson | B65G 47/61 198/465.4 |
| 2005/0230223 | A1 | * | 10/2005 | Gartner | B65G 19/025 198/465.4 |

FOREIGN PATENT DOCUMENTS

| | | |
|---|---|---|
| CN | 2759232 Y | 2/2006 |
| CN | 201135158 Y | 10/2008 |
| CN | 101766353 A | 7/2010 |
| CN | 201602185 U | 10/2010 |
| CN | 202163825 U | 3/2012 |
| EP | 0566553 A1 | 10/1993 |
| GB | 2152463 A | 8/1985 |

* cited by examiner

CONVEYOR WORK STATION

CROSS-REFERENCE TO RELATED APPLICATIONS

This application is the U.S. National Phase under 35 U.S.C. §371 of International Application PCT/SE2013/050892, filed Jul. 12, 2013, which claims priority to Swedish Patent Application SE 1250834-7, filed Jul. 13, 2012. The disclosures of the above-described applications are hereby incorporated by reference in their entirety.

TECHNICAL FIELD

The present invention relates to a conveyor work station according to the preamble of claim 1.

BACKGROUND ART

There are many different material handling systems consisting of conveyor systems and conveyor installations including more or less intelligent control for handling and transporting goods, e.g. workpieces, between different work positions in the manufacture of goods that require several work steps. In one type of material handling system, the conveyor system consists of a main conveyor, which in turn can consist of a plurality of conveyor belts, and a plurality of side conveyors. A side conveyor selectively leads workpieces from the main conveyor to work stations where one or more work steps are performed on the workpiece, after which the workpiece is returned to the main conveyor with the aid of the side conveyor.

A particular type of material handling system comprises a conveyor system in which the main conveyor is placed above the work positions. The workpieces are here secured on hanging product carriers, which are moved on the main conveyor, which can comprise an endless conveyor belt. The side conveyors in this case consist of work stations which are adapted to selectively move a product carrier from the main conveyor, which is located at an upper level, down to a work position, which is located at a lower level, with the aid of a conveyor chain. When the work step has been carried out, the conveyor chain transports the product carrier with the workpiece up to the main conveyor again for continued transport of the product carrier to the next work station. Each product carrier comprises a product holder in which one or more workpieces are secured. The product holder is adapted to the product that is being manufactured and can hold one or more workpieces. These can be, for example, parts of a shirt, in which case the product holder holds all the parts of a shirt at the start of the transport flow and in which the product holder only holds the finished shirt when the product carrier reaches the end of the transport flow. Each product carrier can also comprise some form of identification means, such that the product carrier can be identified by the system, which means that each product carrier can be conveyed to predetermined work stations and onward to predetermined work positions. Such material handling systems are known to a person skilled in the art and are common particularly in the clothing industry.

The conveyor chain that conveys the product carriers in a work station, from the main conveyor to the work position, consists of a number of articulated links, which can be carrier links and intermediate links. A carrier link can also be referred to as an inner link, and an intermediate link can also be referred to as an outer link. Each conveyor chain is driven by one or more separately controlled chain wheels. The carrier links are adapted to be able to couple to and secure a product carrier for transporting workpieces to the work position and for transporting the product carrier back to the main conveyor after the work step has been carried out. The product carrier enters the conveyor chain at a loading position and is securely held by a carrier link until the product carrier is released at a release position at the main conveyor. The product carrier is preferably stopped at the work position when the work step is being carried out, without the product carrier having to be detached from the conveyor chain. If necessary, a product carrier can be released from the conveyor chain, for example for maintenance.

For the product carrier to be coupled to and uncoupled from the conveyor chain, a carrier link is designed with a retaining device in the form of a chain lock which can be opened for receiving a product carrier and closed in order to retain the product carrier. The chain lock can be opened in different ways, for example by a lever arm or by a specially adapted chain wheel. A known carrier link, described in U.S. Pat. No. 4,817,778 A1, is provided with a spring-loaded chain lock, which is opened each time it passes an opening chain wheel, and which closes, via the spring, when it leaves the opening chain wheel. The conveyor chain is driven by a drive chain wheel positioned at the loading position. A further chain wheel which is not driven is positioned at the release position. In this way, the conveyor chain hangs freely between the loading position and the release position and is pulled by the drive chain wheel from the upper chain wheel to the drive chain wheel. The conveyor chain may be supported by a slide support between the release position and the loading position.

Since the conveyor chain is driven by the drive chain wheel at the loading position, the conveyor chain can hang freely such that the lowermost position of the conveyor chain will be situated at the work position at the work station. When a product carrier reaches the work position, the operation on the workpiece can be performed and the product carrier continuous to the release position.

In another work station, described e.g. in CN 101766353 A, the drive motor drives the upper chain wheel, at the release position for the product carrier. The work station also comprises a chain wheel at the loading position. In such a work station, it is necessary to use an extra chain wheel at the lowermost position of the conveyor chain, in order to stabilize the conveyor chain since the conveyor chain cannot hang freely when the upper chain wheel drives the conveyor chain.

Both the described work stations functions properly. There is however room for an improved work station.

DISCLOSURE OF THE INVENTION

The object of the invention is therefore to provide an improved conveyor work station which comprises fewer parts. A further object of the invention is to provide an improved conveyor work station with a simplified design.

The solution according to the invention is described in the characterizing part of claim 1. The other claims contain advantageous embodiments and developments of the conveyor work station according to the invention.

With a conveyor work station comprising an endless conveyor chain adapted to carry product carriers in a hanging manner from a loading position to a release position, where the conveyor work station comprises a first, upper chain wheel driven by a motor, where the upper chain wheel is positioned at the release position, and further comprising a loading arrangement at the loading position, and where the loading position is positioned lower than the release position in a vertical direction, the object of the invention is achieved in that the conveyor work station further comprises a guide track arranged between the upper chain wheel and the loading arrangement, where the guide track is adapted to support the conveyor chain, thereby allowing the conveyor chain to be pushed from the upper chain wheel to the loading arrangement.

In this first embodiment of the conveyor work station according to the invention, the conveyor work station comprises an upper driven chain wheel and a loading arrangement arranged lower than the upper driven chain wheel, where the conveyor chain is pushed from the upper driven chain wheel to the loading arrangement by the upper drive chain wheel by the use of a guide track. The guide track guides and supports the conveyor chain in a secure way by supporting the protruding flanges of the conveyor chain in guide channels in the guide track. This allows the drive motor to be positioned at the upper chain wheel, which simplifies the work station and the installation of the drive motor. At the same time, a higher efficiency is obtained for the work station.

In an advantageous development of the conveyor work station according to the invention, the guide track is bent like an L with an angle between the two flanges of approximately 90 degrees. In this way, the first flange is horizontal at the release position at the upper chain wheel and the second flange is vertical at the loading position. The radius of the bend is relatively large and is adapted to the protruding flanges of the conveyor chain. The radius is preferably at least twice as large as the radius of the chain wheel. At the outer side of the guide track, there are two open channels in which the protruding flanges of the conveyor chain are guided. The channels are somewhat larger than the protruding flanges of the conveyor chain, such that the conveyor chain can be guided in a smooth way and that low friction slide plates can be fitted in the channels.

In another advantageous development of the conveyor work station according to the invention, the loading arrangement of the conveyor work station is provided with guiding channels for the conveyor chain. In this way, the pushing action on the conveyor chain can continue through the loading arrangement. Since the conveyor chain enters the loading arrangement from above in a vertical direction, the loading arrangement does not require a chain wheel in order to guide the conveyor chain. Thus, the loading arrangement does not require any moving parts, which simplifies the loading arrangement considerably.

In another advantageous development of the conveyor work station according to the invention, the conveyor work station further comprises a link wheel which may be arranged in a foldable manner on a stand of the conveyor work station, such that the link wheel can be pivoted to a position in which it guides the conveyor chain at its lowermost position in the work station. In this way, it is possible to stabilize the conveyor chain when an operation on a product held by the product carriers requires that the conveyor chain is fixed in a sideway direction. When the work station is used for another operation, the link wheel can be pivoted out from the conveyor chain such that the conveyor chain hangs freely again.

BRIEF DESCRIPTION OF THE FIGURES

The invention will be described in more detail below with reference to the embodiments shown in the attached drawings, in which.

DESCRIPTION OF EMBODIMENTS

The embodiments of the invention that are described below, along with developments thereof, are to be understood only as examples and do not in any way limit the scope of protection of the claims.

Figure 3:
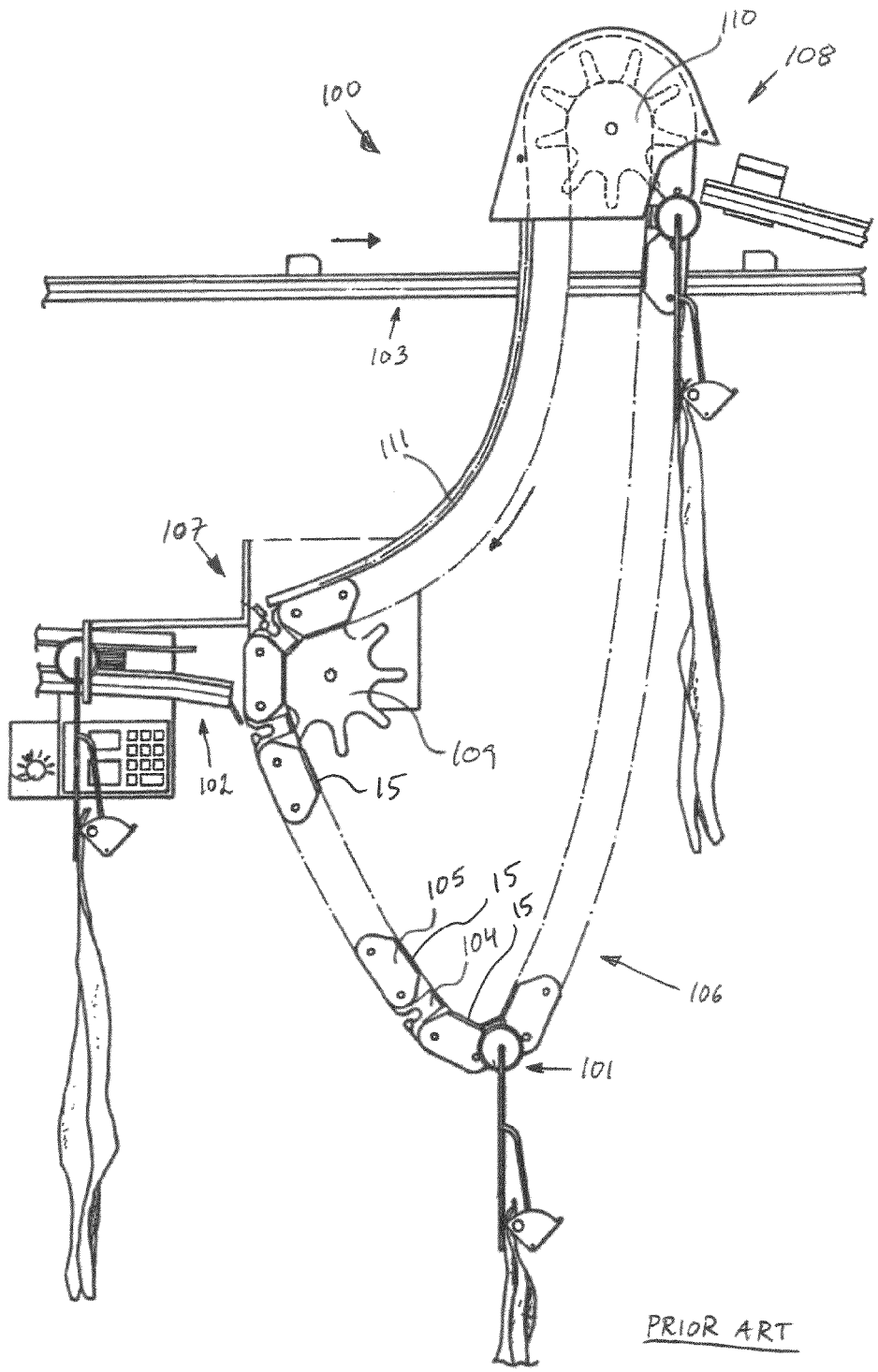
FIG. 3 shows a first prior art work station.

FIG. 3 shows a known work station comprising a conveyor chain adapted to convey product carriers. The work station 100 is arranged at a main conveyor 103 and comprises a conveyor chain 106 which is intended to transport the product carriers 101 from a product feeder at a loading position 107 on a first rail 102 down to a work position located at the lowest point of the chain. When the operation on the product, e.g. an article of clothing secured by the product holder of the product carrier, is completed, the conveyor chain conveys the product carrier up to an unloading position 108 and back to the main conveyor 103 located at an upper level. The conveyor chain is driven by a drive chain wheel 109 positioned at the loading position 107. A further chain wheel 110 which is not driven is positioned at the unloading position 108. Chain wheel 110 is also adapted to open the chain locks of the conveyor chain links that holds the product carrier. In this way, the conveyor chain hangs freely between the loading position and the unloading position and is pulled by the drive chain wheel from the upper chain wheel to the drive chain wheel. The conveyor chain may be supported by a slide support 111 between the release position and the loading position, such that the conveyor chain slides against the slide support when the conveyor chain is pulled from the upper chain wheel by the drive chain wheel. The main purpose of the slide support is to guide and direct the conveyor chain to the chain wheel and to hold it close to the chain wheel so that the conveyor chain does not unmesh when it arrives at the loading position. The slide support can be replaced with a guide wheel positioned close to the drive chain wheel that will guide the conveyor chain to the chain wheel. The conveyor chain consists of carrier links 104 and intermediate links 105. Such a conveyor chain is described in U.S. Pat. No. 4,817,778.

Figure 4:
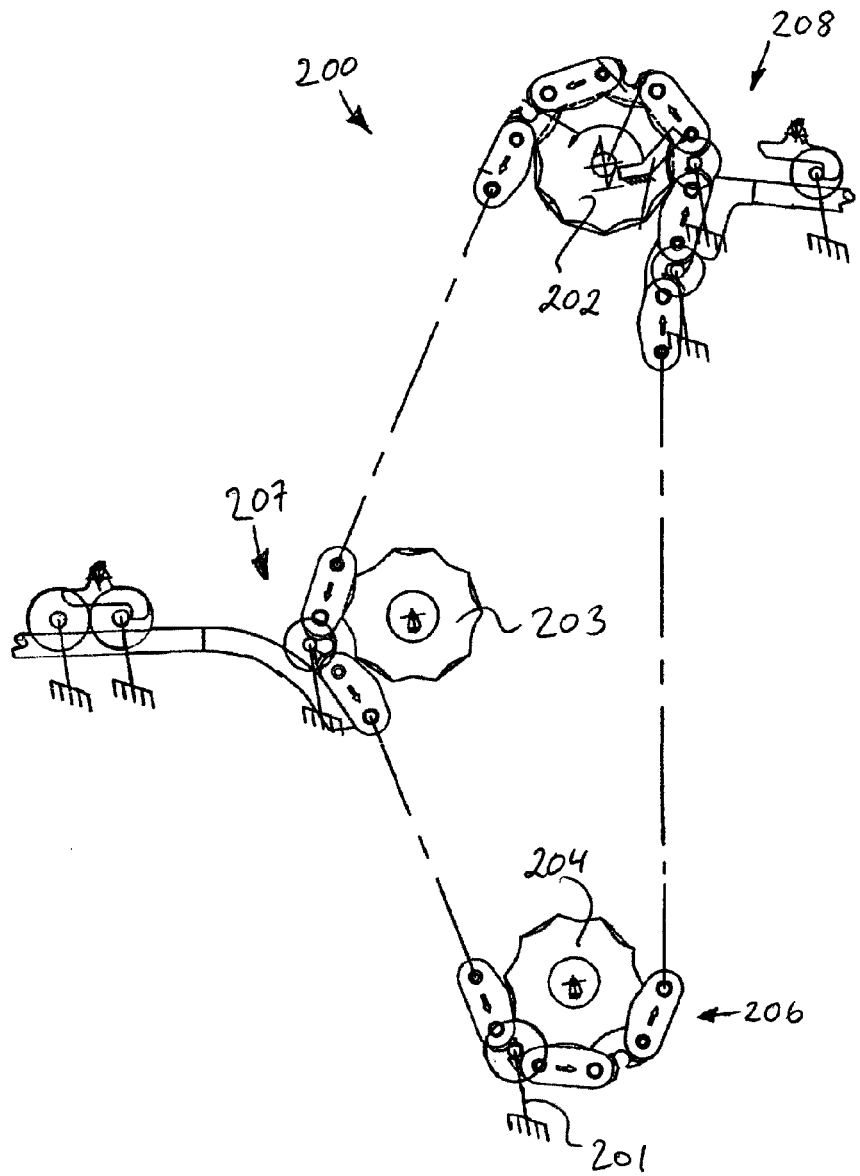
FIG. 4 shows a second prior art work station.

FIG. 4 shows another known work station comprising a conveyor chain adapted to convey product carriers. The work station 200 is arranged to convey product carriers 201 from a loading position 207 to a release position 208 at a main conveyor. The work station comprises a conveyor chain 206 which conveys the product carriers 201 from the loading position 207 to a work position located at the lowest point of the chain and further to the unloading position 208 when the operation on the product is completed. The conveyor chain is driven by a chain wheel 202 positioned at the unloading position 208. A further chain wheel 203, which is not driven, is positioned at the loading position 207, and one more chain wheel 204 is positioned at the work position. In this way, the conveyor chain is stretched between the three chain wheels. In order for the conveyor chain to be driven in a reliable way by the chain wheel at the unloading position and to pass the loading position in a reliable way, there must be a pulling force on the conveyor chain which is provided by the support of the third chain wheel. Without a third chain wheel providing a stretched conveyor chain, the conveyor chain will unmesh and will not be able to pass the loading position in a reliable way.

Figure 1:
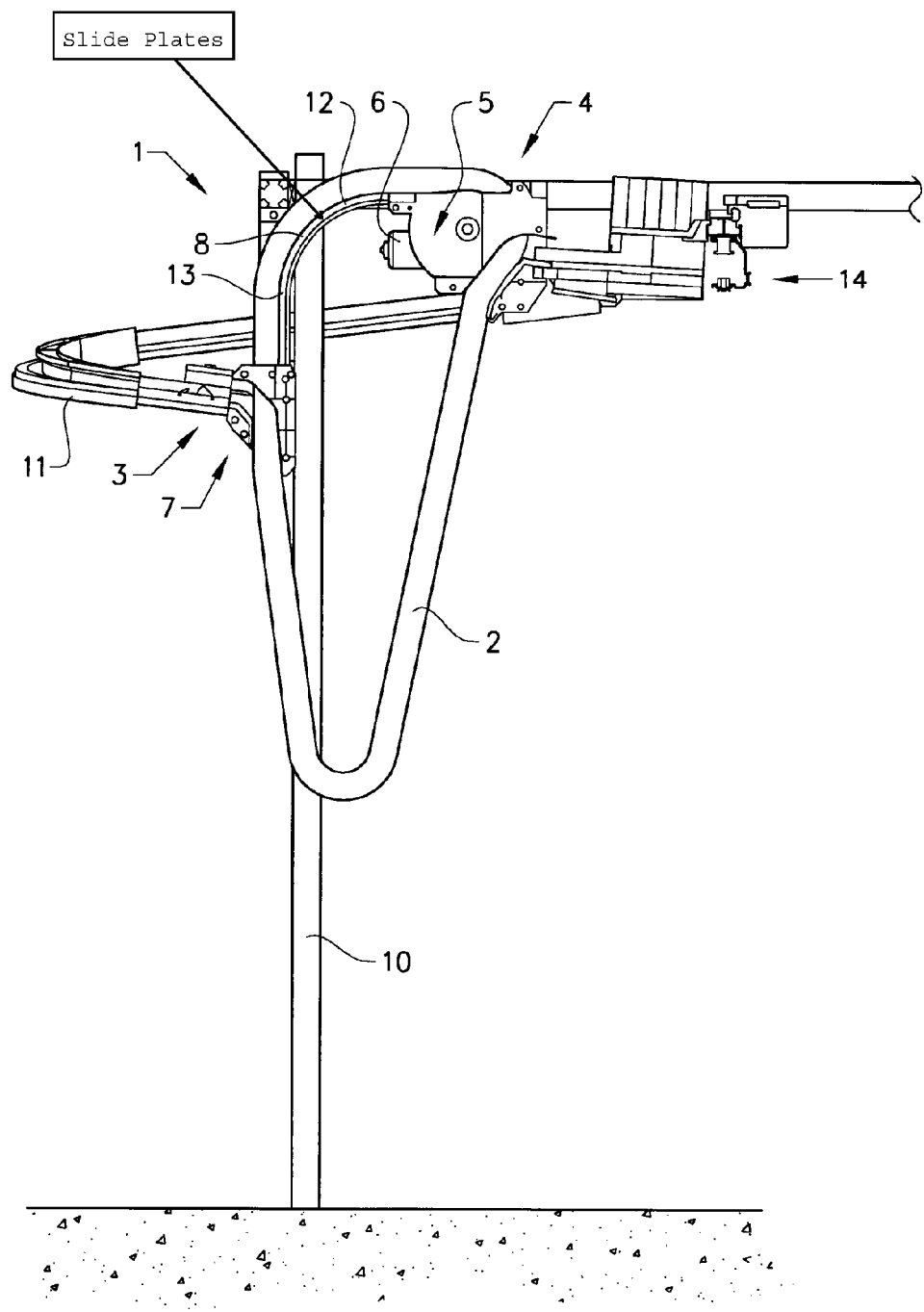
FIG. 1 shows a conveyor work station according to the invention.

FIG. 1 shows an inventive conveyor work station 1. The conveyor work station comprises an endless conveyor chain 2 adapted to carry product carriers (not shown) in a hanging manner from a loading position 3 to a release position 4. The conveyor work station comprises a first, upper chain wheel 5 driven by a motor 6 positioned at the release position, and a loading arrangement 7 positioned at the loading position 3. The loading position is positioned lower than the release position in a vertical direction, since the product carriers are conveyed down to the loading position from a main conveyor 14 by a sloping rail 11.

The conveyor work station further comprises a guide track 8 arranged between the upper chain wheel 5 and the loading arrangement 7. The guide track is adapted to guide and support the conveyor chain in a reliable way by supporting it in the directions perpendicular to the moving direction of the conveyor chain. The guide track 8 thus comprises longitudinal guide channels adapted to support and guide protruding flanges of the conveyor chain, such that the conveyor chain is guided by the guide track 8. This allows the conveyor chain to be pushed from the upper chain wheel 5 to the loading arrangement 7.

In the shown example, the guide track 8 is bent in a shape somewhat resembling an L with an angle between the two flanges 12, 13 of approximately 90 degrees. In this way, the first flange 12 is horizontal at the release position 4 at the upper chain wheel 5 and the second flange 13 is vertical at the loading position 3. The radius of the bend is relatively large and is adapted to the protruding flanges of the conveyor chain 2. The radius is preferably at least twice as large as the radius of the chain wheel 5, and is at least 15 cm. A larger radius is of advantage, since the friction induced in the guide channels will depend on the radius. The size of the radius must however also be balanced by the size of the work station, since a smaller radius will allow a more compact work station. The angle between the two flanges may also be smaller, and an angle between 45 to 90 degrees would be possible to use. In any case, it is advantageous that the second flange 13 is vertical at the loading position 3. The holder of the upper chain wheel is also provided with guide channels that hold the conveyor chain in place at the upper chain wheel. It is important that the conveyor chain is held close to the upper chain wheel. One reason is that the conveyor chain should not unmesh, another reason is that the opening of the chain locks of the conveyor chain is done by the upper chain wheel. If the conveyor chain is not held close to the upper chain wheel, the opening of the chain locks may fail.

The guide channels are positioned at the outer side of the guide track, i.e. the side of the guide track adjacent the conveyor chain. The guide channels are spaced apart such that the protruding flanges of the conveyor chain fits in the guide channels. The guide channels are somewhat larger than the protruding flanges of the conveyor chain, such that the conveyor chain can be guided in a smooth way and such that low friction slide plates can be fitted in the guide channels.

The loading arrangement 7 of the conveyor work station 1 is also provided with guide channels for the conveyor chain. The guide channels of the loading arrangement are similar to the guide channels of the guide track, such that the guiding of the conveyor chain continuous through the loading arrangement. This allows the pushing action on the conveyor chain to continue through the loading arrangement. Since the conveyor chain enters the loading arrangement from above in a vertical direction, the loading arrangement does not require a chain wheel in order to guide the conveyor chain. In this way, the loading arrangement can be made simple with only a few parts, and it does not require any moving parts.

With the inventive conveyor work station, a simple and robust work station is obtained, which requires less parts and which is easier to install than previous known conveyor work stations. Further, the efficiency of the work station is improved due to fewer moving parts, which in turn allows for a smaller drive motor and thus for reduced energy consumption. The work station can also be made more compact, which saves space at a production plant, especially when several work stations are used.

Figure 2:
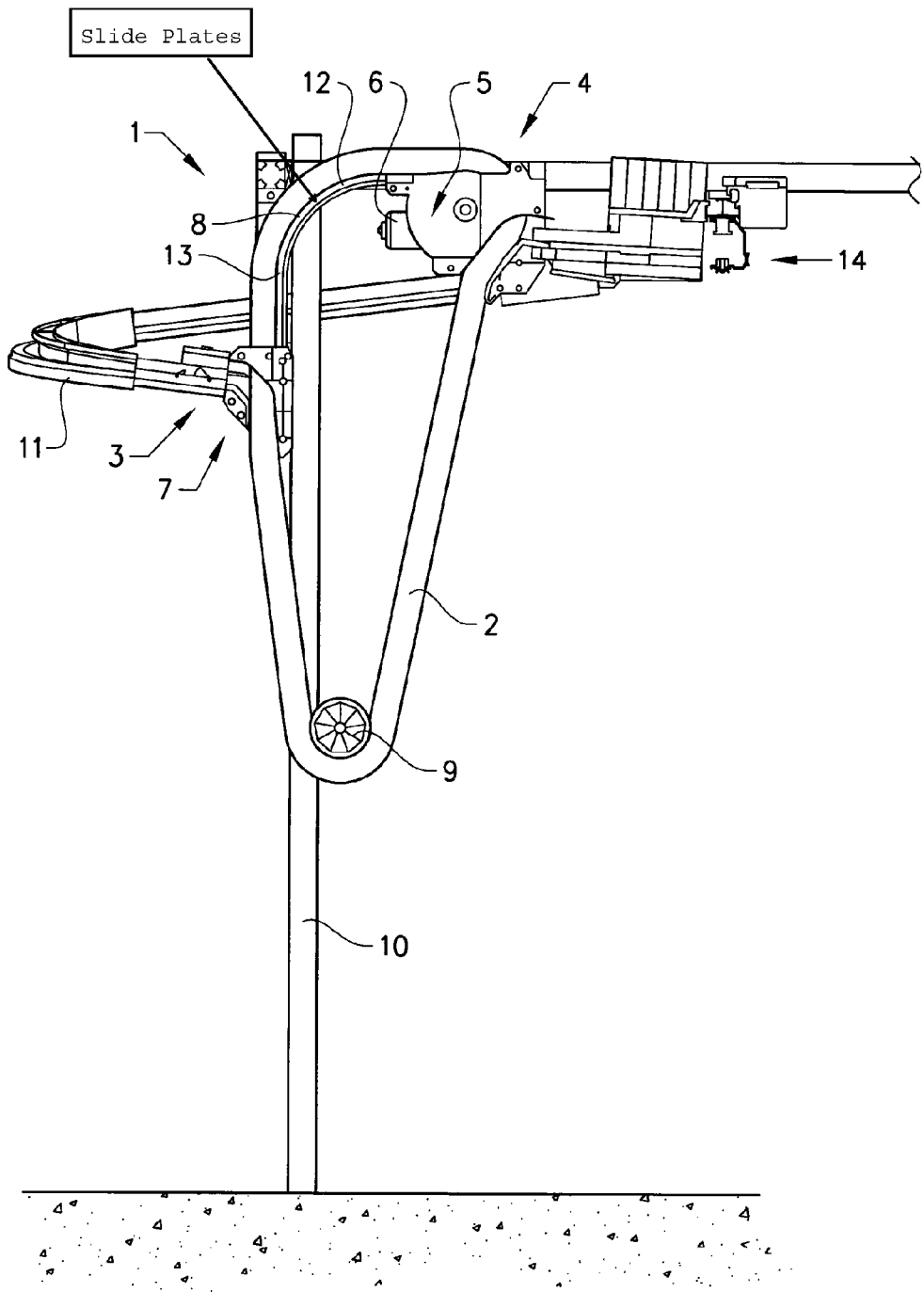
FIG. 2 shows a conveyor work station according to the invention with a link wheel.

In an advantageous development of the conveyor work station, shown in FIG. 2, the conveyor work station further comprises an optional link wheel 9 which can be mounted on a stand 10 of the conveyor work station 1. The link wheel may either be mounted in a removable way, such that it is removed from the stand when it is not used, or it may be mounted in a foldable manner, such that it can be pivoted to the conveyor chain when it is to be used. The link wheel is mounted such that it will guide the conveyor chain at its lowermost position in the work station, i.e. at the work position. In this way, it is possible to stabilize the conveyor chain when an operation on a product held by the product carriers requires that the conveyor chain is fixed in a sideway direction. When the work station is used for another operation, the link wheel can be pivoted out from the conveyor chain such that the conveyor chain hangs freely again. The link wheel is preferably resiliently suspended on the stand in order to minimize vibrations and thus noise induced by the conveyor chain. A further advantage of suspending the link wheel in a resilient way is safety. If something gets caught between the conveyor chain and the link wheel, the link wheel can swing away in order to avoid damage, The invention is not limited to the embodiments described above, and instead a number of other variants and modifications are conceivable within the scope of the attached claims.

REFERENCE SIGNS

1: Conveyor work station
2: Conveyor chain
3: Loading position
4: Release position
5: Upper drive chain wheel
6: Motor
7: Loading arrangement
8: Guide track
9: Link wheel
10: Stand
11: Sloping rail
12: First flange
13: Second flange
14: Main conveyor
15: Protruding flanges
100: Work station
101: Product carrier
102: First rail
103: Main conveyor
104: Carrier link
105: Intermediate link
106: Conveyor chain
107: Loading position
108: Unloading position
109: Drive chain wheel
110: Chain wheel
111: Slide support
200: Work station
201: Product carrier
202: Drive chain wheel
203: Chain wheel
204: Chain wheel
206: Conveyor chain
207: Loading position
208: Unloading position

What is claimed is:

1. A conveyor work station comprising an endless conveyor chain adapted to carry product carriers in a hanging manner from a loading position to a release position, where the conveyor work station comprises an upper chain wheel driven by a motor, where the upper chain wheel is positioned at the release position, and further comprising a loading arrangement at the loading position, where the loading position is positioned lower than the release position in a vertical direction, wherein the conveyor work station further comprises a guide track arranged between the upper chain wheel and the loading arrangement, where the guide track is adapted to support the conveyor chain, thereby allowing the conveyor chain to be pushed from the upper chain wheel to the loading arrangement, wherein the guide track is bent by an angle between 45 to 90 degrees and a second flange of the guide track is substantially vertical at the loading arrangement.

2. The conveyor work station according to claim 1, wherein the guide track comprises longitudinal guide channels adapted to guide protruding flanges of the conveyor chain, such that the conveyor chain is supported in the directions perpendicular to the travel direction of the conveyor chain.

3. The conveyor work station according to claim 2, wherein the guide track comprises low friction slide plates in the guide channels.

4. The conveyor work station according to claim 1, wherein the guide track is bent by substantially 90 degrees such that a first flange of the guide track is substantially horizontal at the upper chain wheel.

5. The conveyor work station according to claim 1, wherein the loading arrangement comprises a guide channel adapted to support the conveyor chain.

6. The conveyor work station according to claim 1, wherein the work station further comprises a link wheel which is adapted to support the conveyor chain at the lowermost position of the conveyor chain.

7. The conveyor work station according to claim 6, wherein the link wheel is arranged in a foldable manner on a stand of the conveyor work station, such that the link wheel can be pivoted to a position in which it guides the conveyor chain at its lowermost position.

8. The conveyor work station according to claim 6, wherein the link wheel is resiliently suspended on the stand.

9. A conveyor system, comprising a main conveyor and a plurality of work stations according to claim 1.

10. The conveyor work station according to claim 7, wherein the link wheel is resiliently suspended on the stand.

* * * * *